H. P. HALL, DEC'D.
F. A. HALL, EXECUTRIX.
FLUID PRESSURE CONTROLLED TRANSMISSION MECHANISM.
APPLICATION FILED JULY 9, 1910.

1,159,018.

Patented Nov. 2, 1915.
5 SHEETS—SHEET 1.

Attest:
Raphaël Netter
G. Blake

Inventor:
H. P. Hall
by Robert M. Pierson, Atty

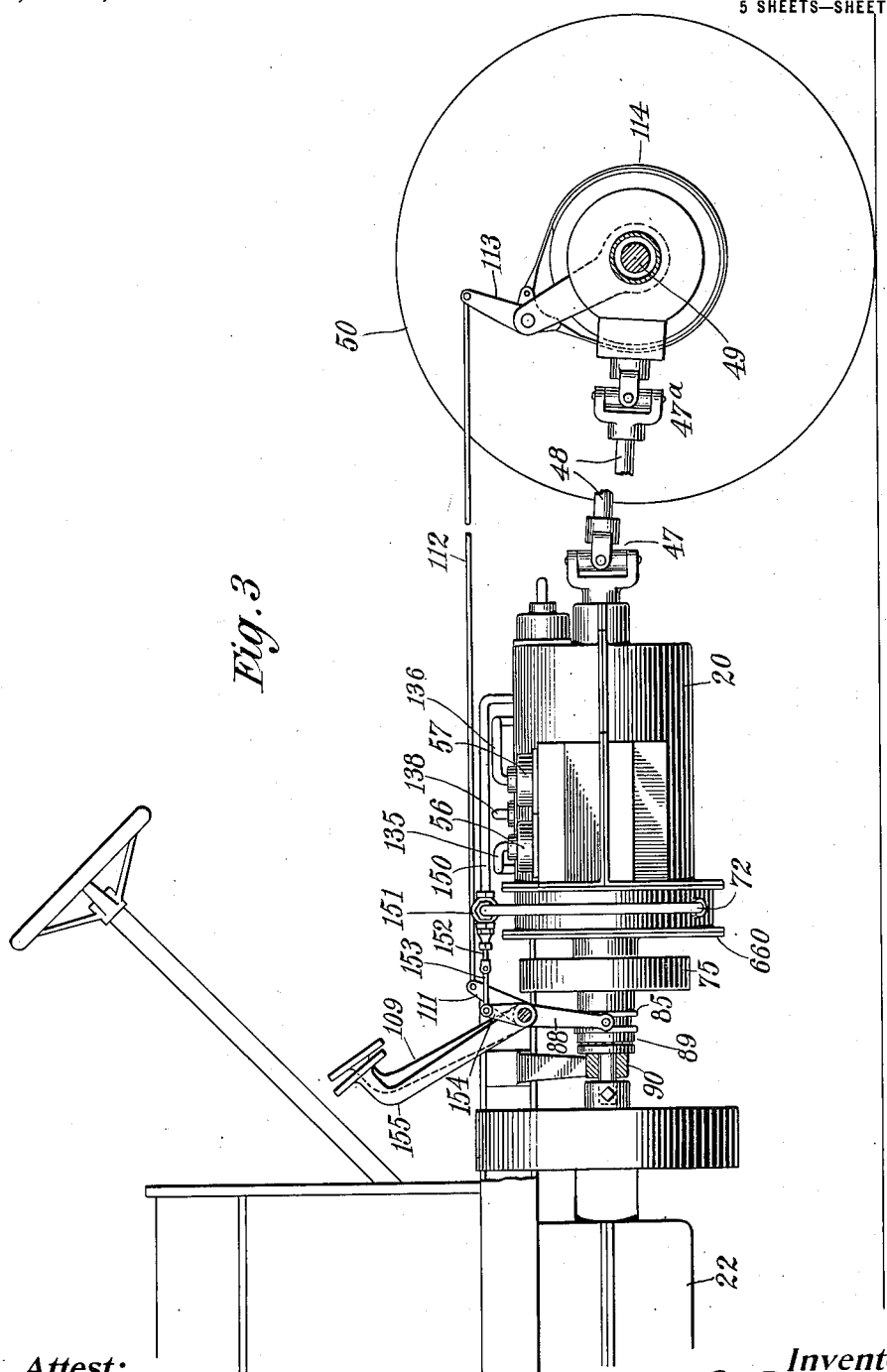

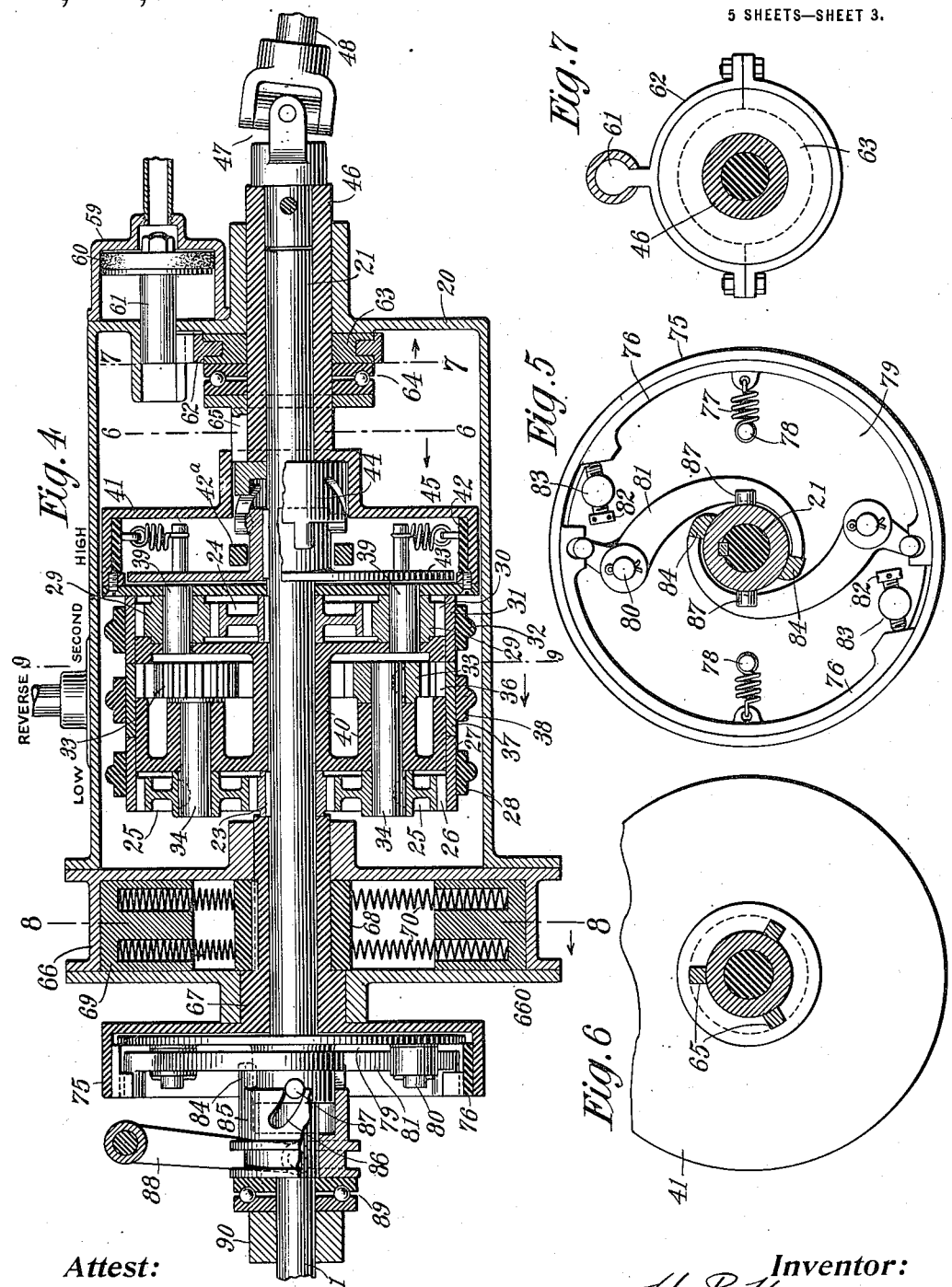

H. P. HALL, DEC'D.
F. A. HALL, EXECUTRIX.
FLUID PRESSURE CONTROLLED TRANSMISSION MECHANISM.
APPLICATION FILED JULY 9, 1910.

1,159,018.

Patented Nov. 2, 1915.
5 SHEETS—SHEET 4.

Attest:
Raphael Letter
G. Blake

Inventor:
H. P. Hall
by Robert M. Pierson Atty

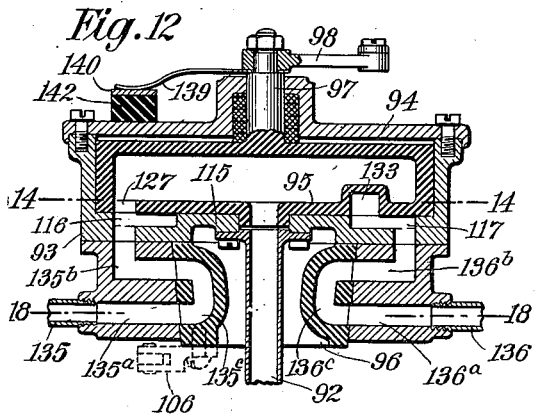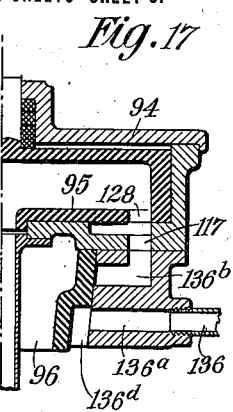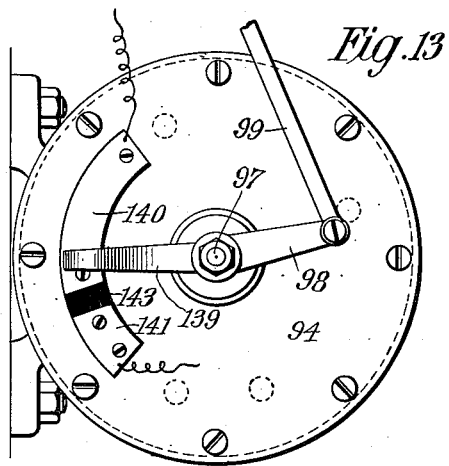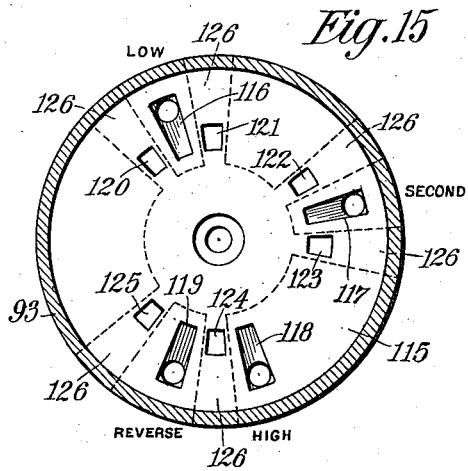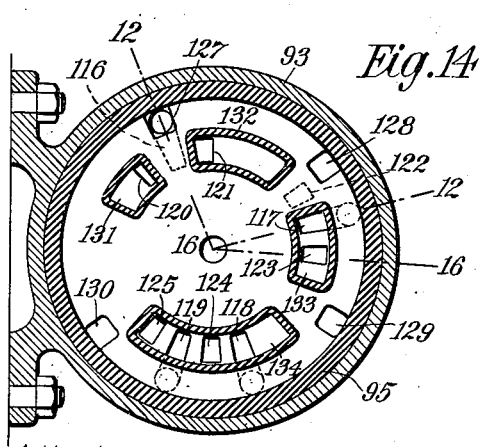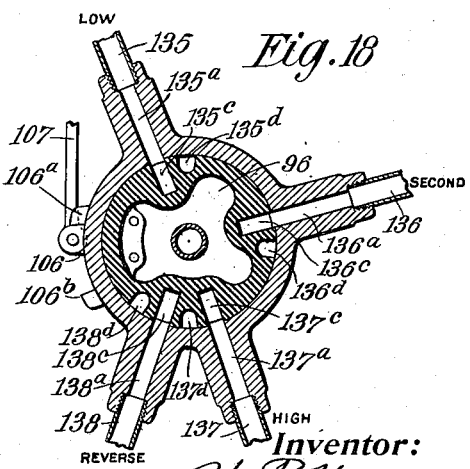

UNITED STATES PATENT OFFICE.

HIRAM P. HALL, OF NEW YORK, N. Y.; FRANKIE ALBERTA HALL EXECUTRIX OF SAID HIRAM P. HALL, DECEASED.

FLUID-PRESSURE-CONTROLLED TRANSMISSION MECHANISM.

1,159,018.   Specification of Letters Patent.   Patented Nov. 2, 1915.

Application filed July 9, 1910. Serial No. 571,146.

*To all whom it may concern:*

Be it known that I, HIRAM P. HALL, a citizen of the United States, residing at New York city, in the county of New York and State of New York, have invented certain new and useful Improvements in Fluid-Pressure-Controlled Transmission Mechanism, of which the following is a specification.

This invention relates to motor vehicles and especially those driven by internal-combustion motors in which a pressure fluid such as compressed air or products of combustion is employed as a medium for performing certain auxiliary or controlling operations, such for example as effecting the connection and disconnection of the driving motor with the wheels, and controlling the gear changes. One objection to the use of auxiliary motors or pressure pistons for such purposes has been that as heretofore devised they have added an undue amount of weight and complication to the vehicle and have been unreliable and unsatisfactory in operation, so that users of such vehicles have generally preferred manual or foot power and mechanical connections for performing these operations.

My invention aims to overcome these objections by the provision of compressed-air or other fluid-pressure-operated means which shall be powerful and reliable in operation, and compactly organized with the power plant and transmission devices of the automobile or motor vehicle, and which shall include a simple form of controller adapted to take the place of the plurality of pedals, lever and gate, or other mechanical devices controlling the gear-changes of the transmission mechanism. This controller may further govern the ignition of the primary motor.

My object in part is also to furnish fluid-pressure means for freeing the primary motor without shifting the position of the gear-controlling device.

Figure 1:
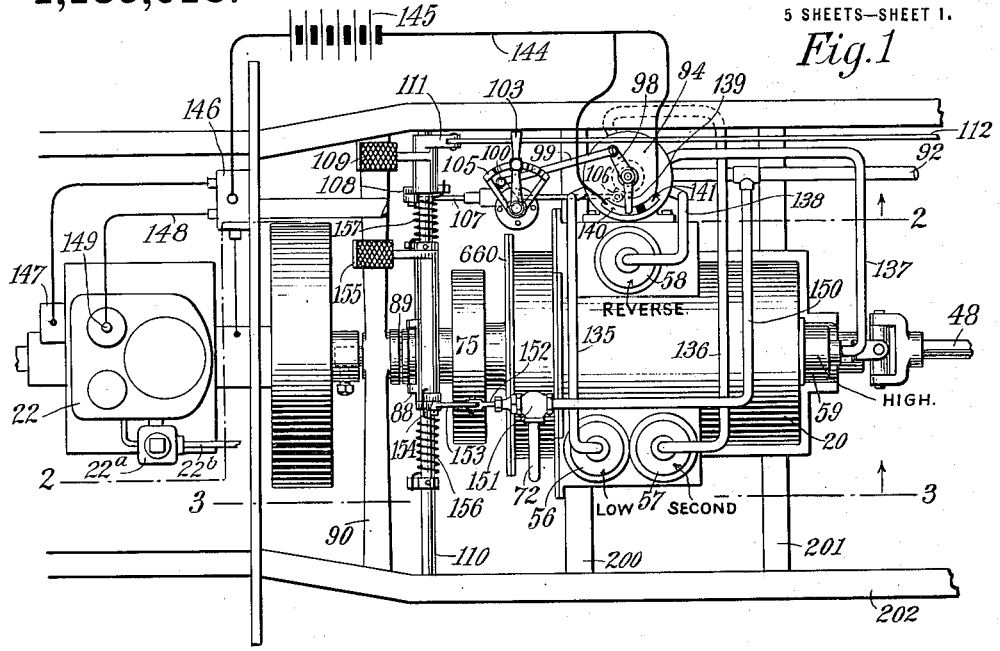
Figure 2:
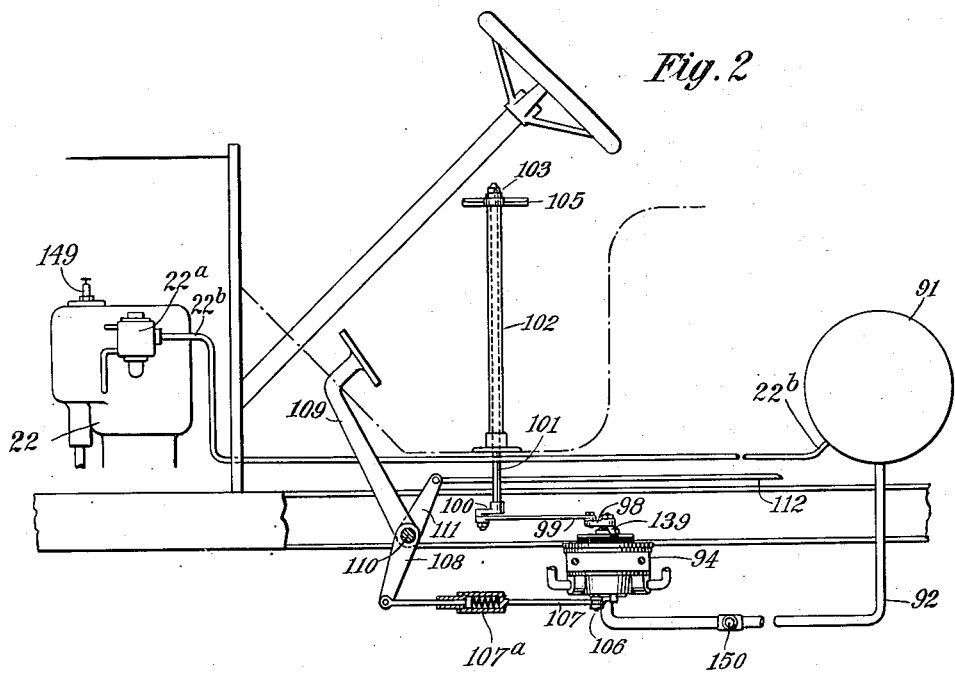
Figure 8:
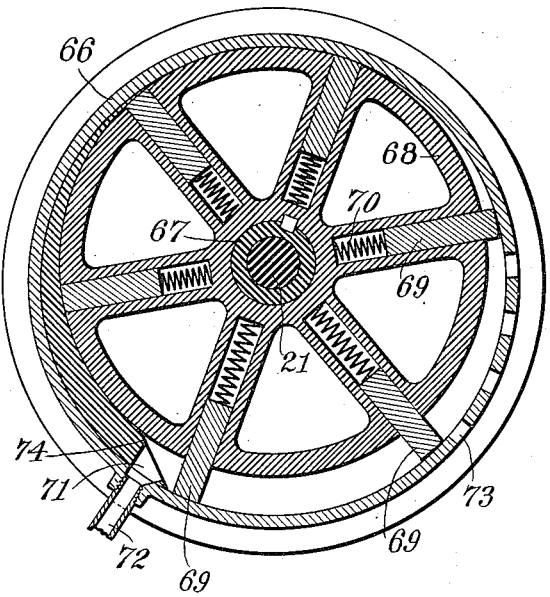
Figure 10:
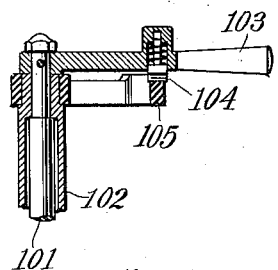
Figure 11:
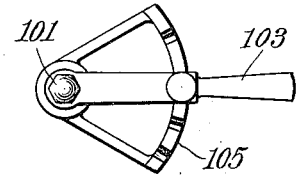
Figure 9:
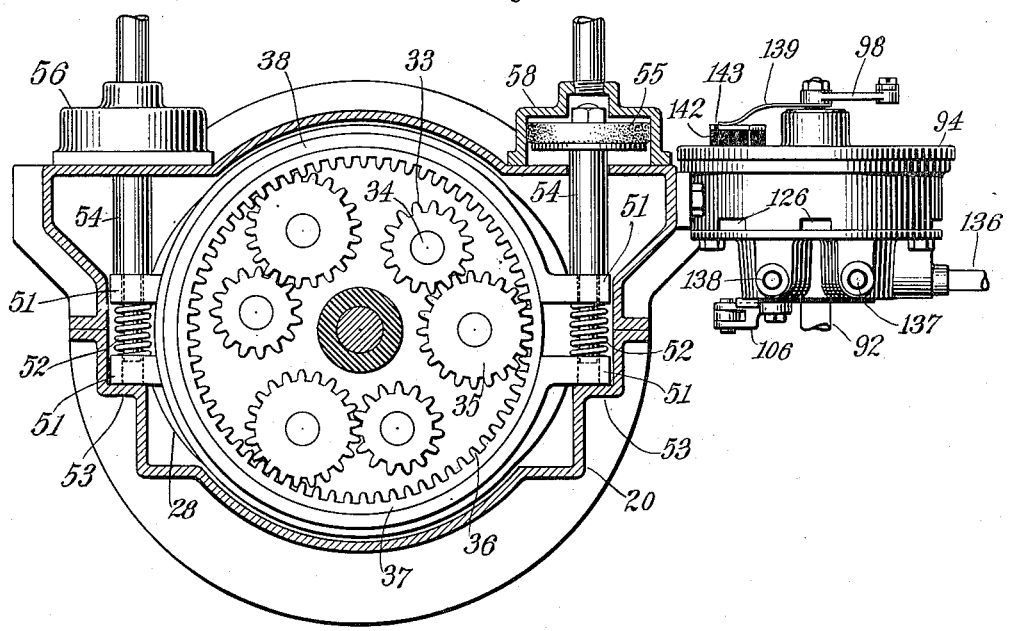

Of the accompanying drawings, Figure 1 represents a top plan view of an automobile driving and controlling mechanism constructed according to my invention. Fig. 2 represents a side elevation, viewed from the plane 2—2 of Fig. 1, showing a part of the controlling mechanism together with the pressure-storing means. Fig. 3 represents a side elevation viewed from the plane 3—3 of Fig. 1. Fig. 4 represents a longitudinal vertical section of the starting and change-gear mechanism. Fig. 5 represents a front elevation of the clutch for connecting the starting motor with the primary-motor shaft. Figs. 6, 7, 8, and 9 represent sections on the correspondingly-numbered lines of Fig. 4. Fig. 10 represents a vertical section of the control-lever and its standard. Fig. 11 represents a top plan view thereof. Fig. 12 represents a transverse section on the line 12—12 of Fig. 14, showing the controller valves. Fig. 13 represents a top plan view of the controller-valve casing. Fig. 14 represents a horizontal section on the line 14—14 of Fig. 12. Fig. 15 represents a plan view of the upper valve-seat. Fig. 16 represents a section on the line 16—16 of Fig. 14. Fig. 17 represents a section on the line 16—16 of Fig. 14, showing the valves moved from their positions in Fig. 12. Fig. 18 represents a section on the line 18—18 of Fig. 12.

The accompanying drawings and the description of the same which follows, are concerned with the application of the principles of my invention to the attainment of the several variable speed driving ratios in the power transmission mechanism of a motor vehicle. However, it is to be understood that such use is merely illustrative, it being clear that the invention finds ready application to various other types of power transmission mechanism, which it may be desirable to control by the agency of a pressure fluid.

I have represented a planetary system of gearing and clutch, arranged in this instance to afford three forward speeds and a reverse, for although my invention applies in a broad sense to other forms of change-gearing, the planetary system is found to be more readily adaptable to my improved mode of pneumatic control. Furthermore, by reason of this mode of control, it is possible to provide a planetary transmission mechanism having three or more forward speeds, without entailing any increase in the number of control levers, one lever or handle sufficing to operate the selecting valve for all of the speeds.

20 is the change-gear box hung upon suitable cross-members 200, 201 of the vehicle frame 202 (Fig. 1) and through said box runs a shaft 21 forming a continuation of the shaft of the internal-combustion motor 22 which is mounted at the forward end of the vehicle frame, said shaft 21 having keyed to it two pinions 23, 24 pertaining respectively to the low-speed and second-speed gear-sets.

25, 25 are the planetary pinions of the low-speed gearing meshing on the inside with the pinion 23 and on the outside with an internal gear 26 formed on a drum 27, the latter being embraced by a holding-band 28. The second-speed planetary pinions 29 mesh on the inside with the shaft-pinion 24 and on the outside with an internal gear 30 on a drum 31 embraced by a holding-band 32. The reversing planetary pinions 33 are keyed to the shafts 34 to which the low-speed pinions 25 are also keyed, and they mesh with a second set of pinions 35 in the reverse train (Fig. 9) which mesh with an internal gear 36 formed on a drum 37 embraced by a holding-band 38. The shafts 34 of the low-speed and reverse trains and the studs 39 of the second-speed train are mounted in a frame or spider 40 loose on the main shaft 21. At the rear, said spider is secured to the high-speed clutch-drum 41 containing friction shoes 42 which are carried by a plate 43 keyed to the shaft 21, and are adapted to be forced outwardly against the drum by the partial rotation of a pair of levers 42$^a$ also pivoted on said plate, the operation of these levers being effected by the twisting movement of a collar 44 caused by forcing it forward in the drum. This clutch is similar to the one hereinafter described in detail for connecting the starting motor to the main shaft. The effect of setting the high-speed clutch, which is designated as a whole by the numeral 45, is to connect the shaft 21 and the drum 41 together so that they revolve as one member at the same speed as the motor. Any suitable form of friction clutch may be used, but it should preferably be one whose operating collar, when the clutch is set, tends to return as soon as the forward pressure is relieved. This enables me to use a single-acting fluid-pressure cylinder for operating the clutch as hereinafter described, and minimizes the amount of adjustment required, because the piston of said cylinder automatically compensates for wear in the clutch. To take the end-thrust caused by said piston, an anti-friction bearing 89 is interposed between the shaft 21 and a cross-member 90 of the vehicle frame. This thrust is transmitted through the shaft without affecting the gears because the latter are all of the spur type and the shaft 21 is continuous from the clutch 45 to the thrust bearing. The hub of drum 41 is continued as a sleeve 46 through a bearing in the rear wall of the gear box and at its rear end is connected through a universal joint 47 with the propeller-shaft 48, the latter being connected through a universal joint 47$^a$ and the usual gearing with the axles 49 of the rear wheels, one of which is shown at 50 in Fig. 3.

To secure low speed ahead, the band 28 will be contracted upon its drum 27 (the other bands and the high-speed clutch being loose) and the spider 40 and drum 41 will then rotate at a speed considerably less than that of the shaft 21. Holding of the drum 31 by its band 32 (the other bands and the clutch being loose) causes the spider 40 and drum 41 to rotate at a somewhat higher speed, though still less than that of shaft 21, and holding of the drum 37 by its band 38 (the other bands and the clutch being loose) causes the spider 40 and drum 41 to be turned at a relatively slow speed in a direction reverse to that of the shaft 21. Lugs 51 (Fig. 9) formed on the ends of the several bands are normally pressed apart by springs 52 to loosen the bands, and the lower ones rest upon shoulders 53 formed in the walls of the gear box 20. The upper lugs are connected by rods 54 with pistons 55 mounted in vertical pneumatic cylinders on the upper side of the gear box, 56 being the cylinder for the low-speed gear, 57 that for the second-speed, and 58 that for the reverse.

Thus it will be seen that in an automobile transmission mechanism having alined driving and driven shafts 21, 46, and means for connecting these shafts either directly or through gearing, I have provided devices for pneumatically effecting the connection of the shafts, the said devices being automatically self-releasing if the air-pressure should be withdrawn either intentionally or by failure of the supply from any cause.

The high-speed clutch has a longitudinal cylinder 59 mounted on the rear end of the gear-box and containing a piston 60 whose rod 61 carries a collar 62 and thrust-sleeve 63 surrounding the drive-sleeve 46, said thrust-sleeve connecting by an anti-friction thrust-bearing 64 with the hub of a three-pronged strut-member 65 which bears on the high-speed clutch collar 44 through suitable apertures in the hub of the drum 41. Among the advantages secured by mounting the fluid-pressure cylinders directly upon the gear-box, with their inner ends open thereto, thereby constituting them a part of the inclosure for the transmission mechanism, are that this eliminates the use of bearings or guides for the control devices through which the lubricant in the gear-box might escape, and allows the transmission mechanism to run in oil without substantial waste, at the same time providing for the lubrication and liquid packing of the pressure pistons. The arrangement of the cylinders 56, 57 and 58 in staggered fashion on opposite sides of the gear box allows for the maximum of diameter in the cylinders and compactness in the transmission structure.

The reference numerals 66 to 73 inclusive and 150 to 156 relate to the construction and control of a starting motor 660 whose casing is attached to the forward end of the gearbox and whose hollow shaft or sleeve 67 surrounds and is adapted to be connected by a clutch 75 with the shaft of the primary motor when it is desired to start the latter by means of stored pressure. The mode of incorporating these parts in the construction of the automobile is not herein claimed, and detailed description is therefore unnecessary except as to the clutch, which will now be described in order to explain the similarly-constructed high-speed clutch 45.

Sleeve 67 carries on its front end a friction-clutch drum 75 containing shoes 76 normally held away from said drum by springs 77 attached to pins 78 on a plate 79 which is fixed to the shaft 21. This plate also carries studs 80 on which are pivoted levers 81 whose outer arms engage the free ends of the shoes 76, the opposite ends of the latter being inclined and bearing against adjusting-screws 82 mounted in lugs 83 on the plate 79. The inner arms of these levers are engaged by lugs 84 on a collar 85 having helical slots 86 occupied by pins 87 on the hub of plate 79, so that when this collar is forced to the rear by means of an operating fork 88, a twisting motion is imparted which expands the shoes 76 against the flange of drum 75 and connects the shaft 21 with the sleeve 67 of the starting motor.

Pressure fluid for operating the gear-control cylinders and the starting motor is stored in a tank 91 (Fig. 2) carried by the vehicle, and it may be compressed air, exploded gases from the motor, or other suitable fluid. The drawings show a water-jacketed check-valve device 22$^a$ applied to the cylinder of the explosion motor and adapted to have its valve loaded with a spring so as to resist the compression pressure but release a part of the exploded charge in a well-known manner, through a pipe 22$^b$ to the tank 91. The pressure fluid from the tank 91 is led through a pipe 92 to the casing 93 of a controller 94 bolted to the side of the gear-box 20. Said controller includes two valves having independent movement, the upper one being a hollow-disk selecting valve 95 into the interior of which the pressure-fluid is led from the pipe 92, the function of this valve being to control the gear changes by charging any selected cylinder with the pressure fluid while venting all of the others; the lower valve being a plug 96 the function of which is to control the supply and exhaust passages of all of the gear-operating cylinders so as to free the motor without regard to the position of the selecting valve, this operation preferably being coincident with the operation of setting the vehicle brake. Valve 96 serves to connect all of the cylinders in parallel either with the selecting valve 95 or with the atmosphere, and hence I term it a "paralleling" valve. The spindle 97 of the valve 95 carries an arm 98 connecting by a link 99 with an arm 100 on a vertical controller shaft 101. The latter is mounted in a hollow post 102 and carries at its upper end within convenient reach of the driver a controlling lever 103 having a spring catch 104 movable over a notched segment 105 on the supporting post. This handle of course may have any suitable support convenient to the driver, other than that shown. The middle position of the controller handle gives the first or low speed, the two rearward positions give the second and high speeds respectively, and the forward position gives the reverse, the neutral position being between low speed and reverse. I am thus enabled to control all of the gear and clutch operations in the transmission with a single controlling element.

The plug-valve 96 carries an arm 106 connecting by a link 107 with an arm 108 on the hub-sleeve of a pedal 109 which is pivoted on the cross-rod 110 and normally elevated by a spring 157 (Fig. 1), and the hub sleeve of this pedal has another arm 111 connecting by a link 112 with the lever 113 of the brake 114 on one of the rear wheels 50 (Fig. 3). A suitable connection would as usual be also provided to the opposite wheel brake. It will be understood of course that any suitable brake on the vehicle may be used in this combination. The arm 106 of the plug valve moves between fixed stops 106$^a$, 106$^b$ (Fig. 18), and the rod 107 contains a suitable spring telescope joint 107$^a$ (Fig. 2) to allow for the full setting of the brake after valve 96 has reached its cylinder-venting position.

In the seat 115 of the selecting valve 95 are formed a series of supply-ports 116, 117, 118, 119 for the low, second, high, and reverse cylinders respectively, and adjacent exhaust-ports 120, 121, 122, 123, 124, and 125, said exhaust-ports communicating directly with the atmosphere through radial passages 126 in the valve-casing. Valve 95 has a series of through-ports 127, 128, 129, 130 adapted to register respectively with the supply-ports 116, 117, 118, and 119 in the valve seat, and it also has a series of bridge-ports or recesses 131, 132, 133, 134 formed in its lower face for connecting the respective supply-ports with their adjacent exhaust-ports in the valve-seat.

The casing of the plug-valve 96 is connected by pipes 135, 136, 137, 138 with the cylinders 56, 57, 58, and 59 for the low, second, high and reverse speeds respectively, these pipes being continued to the seat of the plug-valve by ports 135$^a$, 136$^a$, 137$^a$, 138$^a$ directly above which are other ports 135$^b$, 136$^b$, etc., leading from the valve-seat of the plug-valve to the supply-ports 116, 117, 118, 119 in the valve-seat of the selecting valve. In the conical face of the plug valve are formed bridge-ports 135ᶜ, 136ᶜ, 137ᶜ, 138ᶜ for connecting together the sections of the supply-passages in the casing, and exhaust-ports 135ᵈ, 136ᵈ, 137ᵈ, 138ᵈ leading directly to the atmosphere for exhausting all of the transmission-control cylinders simultaneously. In operating the controlling-valve mechanism, when the driver wishes to go into the first or low-speed gear he places the controller-handle 103 in the middle position as shown in Fig. 1, which turns the selecting valve 95 to the position shown in Figs. 12 and 14, it being understood that the brake-pedal 109 is at this time relieved and the paralleling valve 96 in the position shown in Figs. 12 and 18. The pressure fluid from tank 91 led to the interior of valve 95 then flows out through the valve-port 127, and the seat-port and connecting passage 116, 135ᵇ, 135ᶜ, 135ᵃ, and by way of the pipe 135 to the low-speed cylinder 56, causing a depression of the latter's piston to close the holding band 28 upon the drum 27 and thus render operative the low-speed train in the manner previously described. It will be noted that while port 116 is open to the pressure, all of the other supply-ports are cut off from the interior of valve 95 and connected with their adjacent exhaust-ports 123, 124, 125 by means of the bridging-ports 133, 134. To go into second speed the controller handle 103 is moved one notch to the rear from its position shown in Fig. 1 and this de-registers the ports 127 and 116 and registers the ports 128, 117 so as to supply the second-speed brake-cylinder 57 with pressure fluid while at the same time the low-speed cylinder is exhausted by way of the ports 116, 131 and 120. The same motion de-registers the ports 117 and 133, and the high-speed and reverse cylinders remain exhausted by way of the port 134. To connect the high-speed clutch, controller handle 103 is moved a further notch to the rear, which carries valve 95 around until port 129 registers with port 118. This de-registers 128, 117 and 118, 134 and it registers port 132 with port 117 so that the second-speed cylinder is exhausted through port 122, while the low-speed and reverse cylinders remain exhausted through 131 and 134. To go into reverse, controller-handle 103 is turned into the forward notch on segment 105 and this registers valve port 130 with seat-port 119 so as to charge the reverse cylinder 58 while the others are exhausted by way of the bridging-ports 132, 133 and 134. In a position of the controller-handle midway between its low-speed and reverse positions, the supply of pressure fluid is cut off from all of the gear-changing cylinders and they are all opened to exhaust by way of the ports 132, 133 and 134. When pedal 109 is depressed to operate the brakes 114, plug-valve 96 is thereby thrown to a position in which the several exhaust-ports 135ᵈ, 136ᵈ, 137ᵈ, 138ᵈ are connected with the cylinder-pipes 135, 136, 137, 138, so as to vent all of the cylinders and exhaust whichever one of them may then be under pressure, at the same time shutting off its connection with the interior of valve 95. This allows the motor to run free while the brake is being applied, and as soon as the brake is released the same gear-train or connection which was before established is again automatically thrown in, due to the return of the plug-valve to its normal position. I thus secure an effect similar to that obtainable with the ordinary mechanically-controlled clutch and slide-gear combination of an automobile when the clutch is thrown in and out while any one of the gear-trains is in operation. I have further arranged to control the motor by movements of the controller handle 103. One mode of effecting such control is through the ignition, and for this purpose I have shown a two-point switch comprising an electrically conductive arm or brush 139 attached to the valve-spindle 97 and adapted to contact with either one of a pair of metal plates 140, 141 mounted on an insulating support 142 on the top of casing 93, or with an insulating segment 143 between the two plates. These plates are suitably placed in the igniting circuit of the motor 22 so that when the brush 139 rests on either of them the circuit will be complete, whereas if it rests on the insulating segment 143 the circuit will be broken and the motor stopped. This breaking of the circuit is arranged to take place when the controller handle 103 occupies its neutral position in which the several transmission-control cylinders are exhausted to disconnect the motor from the running wheels. Fig. 1 represents the arrangement of a high-tension ignition circuit in which 144 is the primary wire connected in parallel with the two plates 140, 141 and containing the generator or battery 145, the induction coil 146, and the commutator 147, a high-tension wire 148 being shown leading to the spark plug 149. When the brush 139 is on either plate 140 or 141, the primary circuit will be "grounded" through the valve spindle 97 and other metal parts of the automobile, to which the opposite end of said circuit is connected at the commutator as usual.

I claim,—

1. In a motor vehicle, the combination of a motor, a running wheel, transmission mechanism interposed between the two and including alined driving and driven shafts and means for connecting them either directly or through gearing, and stationarily-mounted devices for effecting the several connections by fluid pressure, the said devices being automatically self-releasing on removal of the fluid pressure.

2. In a motor vehicle, the combination of a motor, a running wheel, transmission mechanism interposed between the two and including alined driving and driven shafts, a single friction clutch for directly connecting said shafts, planetary gearing for connecting them at different relative speeds, and stationarily-mounted fluid-pressure-actuated devices controlling said clutch and gearing and adapted to render the same operative when fluid pressure is applied, the said devices being automatically self-releasing when the fluid presure is removed.

3. In a motor-vehicle, the combination of a running wheel, a motor for driving the same, a planetary change-gear mechanism interposed between the two and having one or more forward-driving trains, a reverse-driving train, and a direct-connecting clutch, a plurality of fluid-pressure cylinders and pistons controlling the respective gear-trains and clutch, said cylinders adapted when charged to render operative the forward and reverse driving trains and the direct-connecting clutch respectively, and when discharged permitting them to become inoperative, and a controlling-valve having means for selectively charging said cylinders and venting those which are not being charged.

4. In a motor-vehicle, the combination of a running-wheel, a motor for driving the same, a change-gear mechanism interposed between the two, a gear box forming an inclosure around said mechanism and having a plurality of fixed fluid-pressure cylinders incorporated therewith, pistons in said cylinders for effecting the several gear-changes, and means under control of the driver for charging and discharging said cylinders.

5. In a motor-vehicle, the combination of a running wheel, a motor for driving the same, a change-gear mechanism interposed between the two and including a plurality of planetary trains, clutch bands therefor, and a direct-connecting clutch, a gear box forming an inclosure which surrounds said mechanism and includes a plurality of fluid-pressure cylinders, pistons in said cylinders for operating said bands and clutch, and means for charging and discharging said cylinders.

6. In a motor-vehicle, the combination of a running wheel, a motor for driving the same, a change-gear mechanism interposed between the two and including planetary gearing which provides a plurality of forward speeds and a reverse speed, a gear box inclosing said mechanism, a series of fluid-pressure cylinders mounted in a plurality of groups on opposite sides of said gear box and having pistons controlling the several gear-changes, and means for charging and discharging said cylinders.

7. In a motor-vehicle, the combination of a running wheel, a motor for driving the same, a change-gear mechanism interposed between the two and having two forward-driving gear-trains, a reverse-driving gear train, and a direct-connecting clutch, a gear-box inclosing said mechanism, two fluid-pressure cylinders mounted on one side of said box and having pistons controlling respectively the low-speed and second-speed gear-trains, a third fluid-pressure cylinder mounted on the opposite side of said gear-box and having a piston controlling the reverse-gear train, a fourth fluid-pressure cylinder mounted on one end of said gear-box and having a piston movable longitudinally of the change-gear mechanism to control said clutch, and valve mechanism for charging and exhausting the respective cylinders.

8. In a motor-vehicle, the combination of a motor, a running wheel, transmission mechanism connecting the two, a plurality of fluid-pressure devices controlling said mechanism, selecting valve means for charging and discharging said devices, and paralleling valve means interposed between said devices and the selecting valve means.

9. In a motor-vehicle, the combination of a motor, a running wheel, transmission mechanism connecting the two, a plurality of fluid-pressure cylinders controlling said mechanism, a selecting valve adapted to charge any of said cylinders and discharge the remainder, and a paralleling valve adapted to independently discharge all of the cylinders or connect them all with the selecting valve.

10. A motor-vehicle having a plurality of fluid-pressure cylinders controlling certain of its functions, a controller-valve casing structure having a pressure-supply inlet, a selecting-valve seat, a paralleling-valve seat, and two sets of passages connecting the latter seat respectively with the cylinders and the selecting-valve seat, a selecting valve adapted to connect the pressure-supply inlet successively with the several passages leading to the paralleling-valve seat while connecting the remaining passages with the atmosphere, and a paralleling valve adapted to connect together the passages of the two sets in its seat or to connect the cylinder passages with the atmosphere.

11. In a motor-vehicle, the combination of a source of fluid pressure, a motor, a running wheel, a brake therefor, a transmission mechanism interposed between said motor and wheel, a fluid-pressure cylinder controlling said mechanism, valve means controlling said cylinder, said means adapted in one position to admit the fluid pressure to said cylinder and in another position to discharge the latter, an element actuated by the operator for mechanically setting and releasing the brake, and connections between said element and the valve means whereby said operations respectively discharge and charge said cylinder.

12. In a motor-vehicle, the combination of a motor, a running wheel having a brake, a transmission mechanism interposed between said motor and wheel and adapted to connect the two in a plurality of speed ratios, a plurality of fluid-pressure cylinders controlling said mechanism and corresponding to the respective speed ratios, valve means for venting all of said cylinders at once, and an operating element connected with said valve means and controlling said brake.

13. In a motor-vehicle, the combination of a motor, a running wheel having a brake, a transmission mechanism interposed between said motor and wheel, a plurality of fluid-pressure cylinders controlling said mechanism, a selecting valve adapted to charge and vent said cylinders, a paralleling valve adapted to vent all of the cylinders or connect them all with the selecting valve, and an operating element connected to move said paralleling valve to its venting position and conjointly set the brake.

14. In a motor-vehicle, the combination of a running wheel, a motor for driving the same, a stationary abutment on the vehicle, a change-gear mechanism interposed between said motor and wheel and including one or more planetary gear trains, a shaft extending from the motor into said change-gear mechanism, a direct-connecting clutch, a single-acting fluid-pressure cylinder and piston adapted to set said clutch by pressure exerted in a direction parallel to said shaft, and a thrust-bearing interposed between said shaft and said abutment.

15. In a motor-vehicle, the combination of a running wheel, a motor, a fixed abutment, a change-gear mechanism interposed between said motor and wheel and including a plurality of forward-driving trains and a reverse-driving train composed of spur gears, and a direct-connecting clutch, a shaft extending from the motor into said change-gear mechanism, a single-acting cylinder and piston adapted to exert endwise pressure in the direction of said abutment to set the clutch, and a thrust bearing interposed between said shaft and abutment.

16. In a motor vehicle, the combination of a running wheel, a motor for driving the same, change-gear mechanism for connecting said motor and wheel in a plurality of speed relations, fluid-pressure-control means for said change-gear mechanism including an element adapted to be operated by the driver, and means actuated by said element for controlling the operation of the motor.

17. In a motor-vehicle, the combination of an explosion motor having electric ignition devices, a running wheel, a transmission mechanism interposed between said motor and wheel, fluid-pressure devices controlling said mechanism, a selecting valve controlling said fluid-pressure devices, an electric switch controlling the motor ignition devices, and means for conjointly operating said switch and selecting valve.

18. In a motor-vehicle, the combination of an explosion motor having an ignition circuit, a running wheel, fluid-pressure-controlled change-gear mechanism interposed between said motor and wheel, a selecting valve controlling said mechanism and providing for a plurality of forward speeds and a reverse speed, an operating handle for said valve, and a switch operated by said handle for controlling the motor ignition circuit, said switch having provision for completing the circuit when the valve is in the forward-speed and reverse positions, and breaking it when between the two.

19. In a motor vehicle, a transmission mechanism, adapted to afford a plurality of speed ratios, a plurality of fluid pressure devices for securing the several speed ratios of said transmission mechanism, means for selectively charging any of said devices, and for discharging the remainder, and other means for discharging all of said devices.

20. In a motor vehicle, a transmission mechanism, adapted to afford a plurality of speed ratios, a plurality of fluid pressure devices for securing the several speed ratios of said transmission mechanism, means for selectively charging any of said devices, and a valve normally connecting all of said devices with said first mentioned means and adapted, when operated, to disconnect all of said devices from said first mentioned means.

21. In a motor vehicle, a plurality of pressure operated controlling devices, means for selectively charging any of said devices and for discharging the remainder, and means for discharging all of said devices independently of the operation of said first mentioned means.

22. In a motor vehicle, a plurality of pressure operated controlling devices, a valve movable into a plurality of positions to selectively charge any of said devices and to discharge the remainder, and a second valve for discharging all of said devices irrespective of the position of the first mentioned valve.

In testimony whereof I have hereunto set my hand in the presence of two subscribing witnesses, this 8th day of July, 1910.

HIRAM P. HALL.

Witnesses:
EDWARD E. BLACK,
R. M. PIERSON.